United States Patent Office 2,956,073
Patented Oct. 11, 1960

2,956,073

INSECTICIDALLY ACTIVE ESTERS OF PHOSPHORUS ACIDS AND PREPARATION OF THE SAME

Richard R. Whetstone, Modesto, Calif., and Denham Harman, Omaha, Nebr., assignors to Shell Oil Company, New York, N.Y., a corporation of Delaware No Drawing. Filed Apr. 13, 1960, Ser. No. 17,448

18 Claims. (Cl. 260—461)

This invention pertains to novel insecticidally active esters of phosphorus acids and to a process for the preparation of the same.

More particularly, the invention pertains to neutral esters of beta-halogen-substituted alpha,beta-olefinically unsaturated alcohols and acids of pentavalent phosphorus as new compositions of matter and to a process for the preparation of the novel esters. The invention includes novel insecticidal compositions comprising the esters to which the invention pertains and it further includes methods for combatting insects with the aid of the novel products and compositions of the invention. This application is a continuing application derived from our copending application Serial No. 274,281, filed February 29, 1952, which is a continuation-in-part of our now-abandoned applications Serial No. 60,174, filed November 15, 1948, and Serial No. 138,705, filed January 14, 1950, said application Serial No. 138,705 being in turn a continuation-in-part of said application Serial No. 60,174.

The new phosphorus esters which are provided by this invention are the neutral esters of beta-halogen-substituted alpha,beta-olefinically unsaturated alcohols with acids of pentavalent phosphorus. Expressed in other words, the new esters are neutral esters of acids of pentavalent phosphorus, wherein one acidic group of the phosphorus acid is combined in ester linkage with a beta-halogen-substituted alpha,beta-olefinically unsaturated alcohol and any additional acidic function or functions of the phosphoruc acid (i.e., when the phosphorus acid is one which is dibasic, or tribasic) is or are combined in ester linkage with the same or different alcohols or phenols R'OH. By the term acids of pentavalent phosphorus we refer to those phosphorus acids in which there is but a single phosphorus atom and that phosphorus atom is in the valence state which is commonly referred to as the pentavalent state. Phosphoric acid, the phosphonic acids and the thiophosphoric and thiophosphonic acids are acids of pentavalent phosphorus. In the neutral esters of this invention, each of the acidic groups, or —OH or —SH groups directly linked to the phosphorus atom of the phosphorus acid, is combined in ester linkage, one by replacement of the acidic hydrogen by the alcohol residue of a beta-halogen-substituted alpha,beta-olefinically unsaturated alcohol, and (when the phosphorus acid is a polybasic phosphorus acid) the other or others by the residue or residues R' of the same or different alcohols or phenols R'OH. Illustrative of but not restrictive of the novel esters of phosphorus acids of the invention are the following: beta,beta-dichlorovinyl diethyl phosphate, beta-beta-dichloro-alpha-phenylvinyl dipropyl phosphate, beta-chloro-beta-propionylvinyl diethoxyethyl phosphate, beta-chlorovinyl ethyl benzenephosphonate, beta,beta-dibromovinyl 3-(p-chlorophenoxy) - 2 - chloropropyl ethyl phosphate, and beta,beta-dibromovinyl dibenzenephosphonate.

The structure of the novel esters that may be produced by the process of the invention may be represented by the structural formula

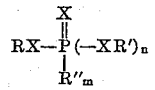

in which R represents the residue R of a beta-halogen-substituted alpha,beta-olefinically unsaturated alcohol ROH, R' represents the residue R' of an alcohol or phenol R'OH, and R'' represents an organic radical which is directly bonded to the phosphorus atom by a phosphorus-to-carbon bond, and each X represents an atom of a nonmetallic chalcogen element, i.e., oxygen or sulfur. The letters $m$ and $n$ each represent integral numbers having values from 0 to 2, inclusive, and $m+n=2$.

In the beta-halogen-substituted alpha,beta-olefinically unsaturated alcohols the alcoholic hydroxyl group is directly linked to an olefinic carbon atom. This carbon atom is designated the alpha carbon atom. The alpha carbon atom is directly linked by an olefinic bond to a second olefinic carbon atom which is designated the beta carbon atom. The beta carbon atom bears at least one atom of halogen directly linked thereto. It will be appreciated by those skilled in the art that in a number of cases the beta-halogen-substituted alpha,beta-olefinically unsaturated alcohol will not be susceptible to isolation in the free state. Just as the vinyl esters, such as vinyl acetate, can be referred to as being esters of vinyl alcohol, which is not susceptible to isolation in the free state, so can the present esters be referred to as being esters of the beta-halogen-substituted alpha,beta-olefinically unsaturated alcohols regardless of whether the alcohol per se is capable of existence in the free state. It is not intended to limit the invention according to whether the beta - halogen - substituted alpha,beta-olefinically unsaturated alcohol is one which is known in the free state or, like vinyl alcohol, is one which is known only in the form of its derivatives, such as its esters.

Novel esters provided by a preferred aspect of the present invention may be represented by the formula

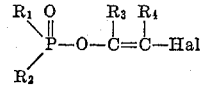

wherein $R_1$ and $R_2$ are independently selected from the group of organic radicals consisting of alkyl, alkoxy, haloalkoxy, alkoxyalkoxy, aryloxy-haloalkoxy, aryl and aryloxy, Hal is an atom of halogen, $R_3$ is a member of the group consisting of hydrogen, alkyl radicals and aryl radicals, and $R_4$ is a member of the group consisting of hydrogen, halogen, alkyl radicals, acyl radicals, and alkoxycarbonyl radicals.

Novel esters provided by a further, subgeneric aspect of the invention include those that are represented by the formula

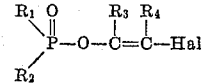

wherein $R_1$ and $R_2$ are selected from the group of organic radicals consisting of aryl (e.g., phenyl, tolyl, naphthyl, xylyl, 2,4-dichlorophenyl, and pentachlorophenyl), suitably monocyclic carbocyclic aryl, alkoxy (e.g., methoxy, ethoxy, propoxy, isopropoxy, butoxy, sec-butoxy, the amyloxy, the hexyloxy, the octyloxy, the nonyloxy, the decyloxy, the tetradecyloxy, and the octadecyloxy groups), haloalkoxy (e.g., 2,3-dichloropropyl), and alkoxyalkoxy groups (e.g., ethoxyethoxy and other lower alkoxy "Cellosolve" ethers), Hal is selected from the group consisting of chlorine and bromine, $R_3$ is a member of the group consisting of hydrogen and alkyl radicals (e.g., methyl, ethyl, propyl, isopropyl, a butyl, a pentyl, a hexyl, an octyl or other, preferably lower alkyl radical), and $R_4$ is a member of the group consisting of hydrogen, chlorine, bromine, and the alkyl (preferably lower alkyl) radicals.

The atoms of halogen represented by Hal and by $R_4$ may be the same halogen or they may be different halogens. As the halogens there are contemplated bromine, fluorine, chlorine, and iodine; bromine, chlorine and fluorine being the particularly preferred halogens.

Although the generic invention is to be clearly understood as being not limited thereto, a particularly valuable sub-group of the novel phosphorus esters of the invention is the esters of (1) the beta-halogen-substituted alpha,beta-olefinically unsaturated alcohols with (2) the acid diesters of phosphoric acid; i.e., the esters of beta-halogen-substituted alpha,beta-olefinically unsaturated alcohols with those monobasic acids which are derived from $H_3PO_4$ by esterification of two only of the three acid groups. A second valuable sub-group of the novel phosphorus esters of the invention are the esters of (1) beta-halogen-substituted alpha,beta-olefinically unsaturated alcohols with (2) the acid phosphonic esters; i.e., with the monobasic acids which are derived from the primary phosphonic acids by esterification of one only of the two acid groups. A third valuable sub-group are the esters of (1) the beta-halogen-substituted alpha,beta-olefinically unsaturated alcohols with (2) the secondary phosphonic acids. Of particular interest and value are the novel phosphorus esters of the invention in which the alcohol and phenol residues each contain not more than about 18 carbon atoms.

The residues R' in the foregoing generic formula may be the residues of any monohydric or polyhydric alcohol or phenol, R'OH. In the esters of tribasic acids of phosphorus (e.g., in the novel phosphates of the invention) the residues represented by R' may be the same or different or they may form together the divalent residue —OR'O— of a 1,2- or 1,3-dihydric alcohol or glycol. Illustrative alcohols and phenols, the residues of which are represented by the R' groups of the foregoing formulas, include among others the aliphatic alcohols, such as methyl, ethyl, propyl, isopropyl, allyl, butyl, crotyl, sec-butyl, the amyl, the hexyl, the octyl, the nonyl, the decyl, the tetradecyl, and the octadecyl alcohols, the cycloaliphatic alcohols, such as cyclohexanol, 3,3,5-trimethylcyclohexanol, and cyclopentanol, heterocyclic alcohols, such as furfuryl alcohol, polyhydric alcohols, such as ethylene glycol, propylene glycol, trimethylene glycol, and 1,2-octanediol, and phenols and aromatic alcohols, such as phenol, 4-ethylphenol, 3,5-dimethylphenol, 2,3,5-trimethylphenol, p-t-butyl phenol, phenethyl alcohol, benzyl alcohol, and the like, and their various homologs and analogs. Although R' ordinarily represents the residue of an unsubstituted alcohol or phenol, that is to say, an alkyl group or a hydrocarbon aryl group, non-hydrocarbon substituents may be present. Substituents suitable to the objects of the invention include, among others, halogen, alkoxy, nitro, nitrillo, aryloxy, carboalkoxy, and carbonyl. Illustrative of alcohols and phenols containing such non-hydrocarbon substituents are 2,3-dichloropropanol, 3-methoxypropanol, beta-chloroallyl alcohol, methoxyethoxyethanol, 3-carbethoxypropanol, 4-nitrobutanol, 3-cyanopropanol, 2-oxo-4-methylpentanol, 2,3-diphenoxypropanol, nitrophenol, p-methoxyphenol, 2,4-dichlorophenol, ethyl salicylate, and other alcohols and phenols which are substituted by substitutents which do not alter the essentially alcoholic or phenolic function of the alcohol or phenol.

The hydrocarbon group or groups which may be substituted on the alpha and/or beta carbon atoms of the residue of the beta-halogen-susbtituted alpha,beta-olefinically unsaturated alcohol include unsubstituted hydrocarbon groups and hydrocarbon groups which include one or more substituents on or within their structure. Such unsubstituted hydrocarbon groups are represented by and include the alkyl groups, such as methyl, ethyl, propyl, isopropyl, the butyls, the pentyls, the hexyls, the octyls, and their higher homologs, the hydrocarbon aryl groups, such as phenyl, tolyl, naphthyl, and the like, aliphatically unsaturated hydrocarbon groups, such as allyl and crotyl, and cycloaliphatic groups, such as cyclohexyl and cyclopentyl. The substituted hydrocarbon groups can be substituted by or contain within their structure one or more substituent groups or atoms such as keto (=O), carbonyloxy (—O—CO—), oxy (—O—), halogen, nitrillo, nitro, mercapto (—S—), and the like, as in the carbethoxy, carbethoxyethyl, butoxypropyl, methoxyethoxyethyl, acetyl, propionyl, chlorobenzoyl, cyano, butyryl, or like groups.

In the phosphonates of the invention the organic group or groups that are bonded to the phosphorus atom by a P—C linkage may be alkyl, aryl, aralkyl, or alkaryl, which groups may be substituted as by halogen, alkoxy, aryloxy, carboalkoxy, nitro, nitrillo, carbonyl, or like substituent groups or atoms. The preferred phosphonates are those in which the group or groups represented by R'' is or are an aryl group or aryl groups.

In accordance with the invention, the hereinbefore and hereinafter described neutral esters of beta-halogen-substituted alpha,beta-olefinically unsaturated alcohols with oxy-acids of pentavalent phosphorus are prepared directly by a novel reaction effected between (a) halogen-substituted carbonyl compounds (i.e., aldehydes and ketones) having a plurality of atoms of the same or of different halogens directly substituted on a single atom of carbon which is in the alpha position with respect to an aldehydic or ketonic carbonyl group and (b) neutral esters of acids of trivalent phosphorus. The reaction, which has been found to be of broad applicability, is illustrated but not limited by the following equations:

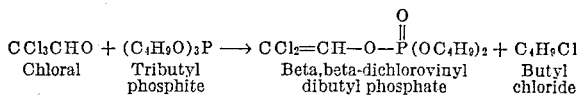

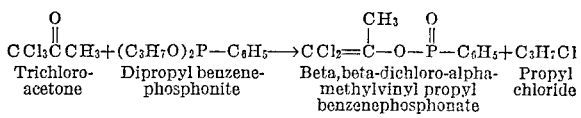

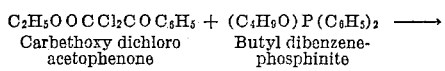

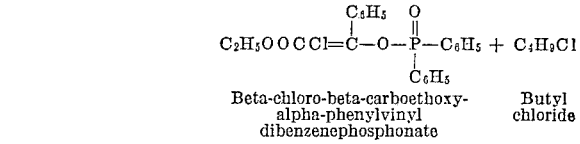

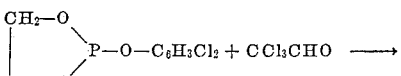

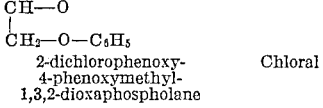

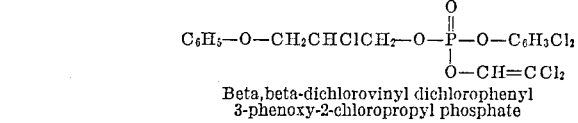

From the foregoing equations it will be seen that the novel reaction can be described as leading to (1) displacement of one alcohol residue from the ester of the acid of trivalent phosphorus by the residue of the beta-halogen-substituted alpha,beta-olefinically unsaturated alcohol which corresponds to the enolic form of the halogen-substituted carbonyl compound having one less alpha halogen than the halogen-substituted carbonyl compound actually employed and (2) to conversion of the phosphorus atom to a valency greater than three. With acyclic esters of trivalent phosphorus the alcohol residue displaced from the phosphorus reactant appears as evolved halogen ester. With the cyclic esters the reaction leading to splitting of the ring leads to no evolution of a separate molecule of halogen ester.

As the halogen-substituted carbonyl compound there may be employed any halogen-substituted aldehyde or ketone containing a plurality (i.e., from two to three, inclusive) of atoms of halogen directly substituted on a single carbon atom in the alpha position to a ketonic or aldehydic carbonyl group. Suitable alpha-polyhalogeno aldehydes and ketones include: monoaldehydes and monoketones having as the only substituents a plurality of atoms of halogen substituted on a single carbon atom which is adjacent to the carbonyl group, such as chloral, dichlorofluoroacetaldehyde, bromal, 1,1,1-trichloroacetone, 1,1,1-tribromoacetone, triiodoacetaldehyde, trichloroacetophenone, dichloroacetophenone, dichloroacetaldehyde, alpha,alpha-dichloropropionaldehyde, alpha-fluoroalpha - chloropropionaldehyde, 3,3-dibromo-2-octanone, 1,1,1-trichloro - 2 - hexanone, trichloroacetonaphthone, alpha,alpha - dichlorobutyrophenone, 2,2-dichlorocyclohexanone, trichloromethyl cyclohexyl ketone, alpha,alpha-dibromobutyraldehyde, alpha,alpha-dichloro-beta-phenylpropionaldehyde, 2,2-dichloro-4-ethyloctanal, and homologs and analogs thereof; monoketones having a plurality of atoms of halogen substituted on each of the two carbon atoms adjacent to the carbonyl group, such as perchloroacetone, 1,1,1,3,3-pentachloro-2-butanone, and 2,2,4,4-tetrachloro-3-pentanone, and homologs and analogs thereof; polyaldehydes, polyketones, and ketoaldehydes having a plurality of atoms of halogen substituted on one only or on each of more than one of the carbon atoms adjacent to aldehydic or ketonic carbonyl groups, such as 3,3-dichloroheptane-2,4-dione, 3,3-dichloropentane - 2,4 - dione, 1,1,1 - trichloropentane - 2,4 - dione, 1,1,1,6,6,6 - hexachlorohexane - 2,5 - dione, alpha,alpha, alpha′,alpha′ - tetrachloroglutaraldehyde, 1,1,1 - trichlorobutane-2-one-4-al, trichloropyruvic aldehyde and homologs and analogs thereof; alpha-polyhalogeno aldehydes and ketones, containing one or more atoms of halogen in addition to those substituted in the alpha position to carbonyl, such as perchloropropionaldehyde, alpha,alpha, beta - trichloropropionaldehyde, alpha - chloro - alpha, gamma - dibromobutyraldehyde, perchloroacetophenone, 2,4 - alpha,alpha - tetrachloroacetophenone, perchloro methyl ethyl ketone, 2,2,6,6,6-pentachlorohexanal, and 1,1,1-trichloro-4-bromo-2,6-heptanedione and homologs and analogs thereof; and alpha-polyhalogeno aldehydes and ketones which contain in their structure in addition to the ketonic and/or aldehydic carbonyl groups and halogen one or more inert or chemically reactive substituents such as carbonyloxy (—O—OC—), oxy (—O—), nitro, mercapto (—S—), nitrillo, and the like. Substituted alpha-polyhalogeno aldehydes and ketones which can be employed in accordance with the invention include among others the following: ethyl cyanoacetyl-dichloroacetate, 4-nitro - 3 - bromo-alpha,alpha-dichloro-acetophenone, 2,2-dibromo - 5 - methylmercaptopentanal, 6-hydroxy-3,3-dibromo-2-hexanone, ethyl acetyldichloroacetate, butyl propionyldichloroacetate, 2,2-dichloro-4-methoxybutanal, and 2,2-dibromo-3-furfurylpropanal.

As the phosphorus-containing reactant there is employed a neutral ester of an acid of trivalent phosphorus, e.g., a neutral phosphite or triester of phosphorous or a thiophosphorous acid, a phosphonite or thiophosphonite, or a phosphinite or thiophosphinite. Suitable phosphorus-containing compounds will have structures defined by the formula $$(R'X—)_pPR''_q$$

in which R′, R″, and X are defined as hereinabove and $p$ represents one of the numbers 1, 2 and 3, and $q=3-p$.

Phosphites which can be employed include the neutral phosphites of the lower aliphatic alcohols, such as trimethyl phosphite, triethyl phosphite, tributyl phosphite, methyl ethyl propyl phosphite, and other trialkyl phosphites wherein the alkyl groups preferably may each contain from 1 to 10 carbon atoms, inclusive, cyclic phosphites of polyhydric alcohols, such as 2-ethoxy-1,3,2-dioxaphospholane (ethyl 1,2-ethylene phosphite), 2-(3,5-dichlorophenoxy) - 4 - chloromethyl-1,3,2-dioxaphospholane, and 3-phenoxy-4-acetoxymethyl-1,3,2-dioxaphospholane, and aromatic phosphites, such as methyl diphenyl phosphite, ethyl 2,4-dichlorophenyl xylyl phosphite, butyl pentachlorophenyl phenyl phosphite, and other monoalkyl diaryl and dialkyl monoaryl phosphites. Phosphonites and phosphinites which may be employed contain one or two, respectively, organic groups directly bonded to the phosphorous atom by a phosphorus-to-carbon linkage such as a hydrocarbon group or groups, or a hydrocarbon group or groups substituted by chemically inert or non-functional atoms or groups which do not alter the essentially hydrocarbon character of the hydrocarbon group. Suitable phosphonites and phosphinites include among others the following: diethyl benzenephosphonite, dibutyl butanephosphonite, dioctyl butanephosphonite, ethyl pentyl p-chlorobenzenephosphonite, butyl dibenzene phosphinite, and amyl benzene-(butane)phosphinite. Thiophosphites, thiophonites, and thiophosphinites analogous to the foregoing wherein one or more of the oxygen atoms bonded to the phosphorus atom is or are replaced by divalent sulfur, may be employed according to the generic invention, the preferred phosphorus-containing reactants being the esters of the oxy-acids of trivalent phosphorus. In general, the phosphorus-containing reactant advantageously is one in which at least one of the esterifying groups or alcohol residues is the residue of a lower aliphatic alcohol containing from 1 to 6 carbon atoms. Particularly preferred are the neutral esters of $H_3PO_3$ with aliphatic alcohols which neutral esters contain from 3 to 30 carbon atoms, inclusive, per molecule, although it will be understood that the generic invention is not limited to this preferred sub-group.

The novel reaction can be carried out simply by mixing the selected reactants and thereafter maintaining the reaction mixture at reaction temperature. Temperatures upwards from 10° C. can be used, up to temperatures as high as 150° C. or more. The reaction is exothermic and in some cases may tend to be violent. The reaction can be controlled and the temperature maintained at the desired level by slowly adding one of the reactants to the other, by employing an inert diluent or solvent, such as a hydrocarbon solvent, e.g., pentane, nonane, decane, benzene, toluene, mesitylene, or an etheral solvent, such as diethyl ether, diisopropyl ether, or dioxane, or by other techniques which will be apparent to those skilled in the art. Evolved halogen ester, e.g., alkyl halide, desirably is removed substantially as rapidly as formed. For example, the reaction may be conducted at the boiling point of the reaction mixture and the evolved halogen ester fractionated from the vapors and withdrawn from the system as it is formed in the reaction.

The reactants usually are employed in about equimolar quantities, although lesser amounts of either reactant may be employed. A broad applicable range of mole ratios between the reactants is 10:1 to 1:10. The preferred range is 2:1 to 1:2. The process can be carried out batchwise, semi-continuously, or continuously. The time required for completion of the reaction is in most cases relatively short, e.g., from 10 minutes to an hour or two, although the reaction time can be varied as required.

The phosphorus ester of the beta-halogen-substituted alpha,beta-olefinically unsaturated alcohol can be separated from the reaction mixture, when its separation is desired, by conventional techniques, such as distillation, extraction with selective solvents, or the like. Depending inter alia upon the intended use, separation of the product from the crude reaction mixture may be dispensed with entirely.

The following examples will illustrate certain of the many specific embodiments of the invention.

EXAMPLE I

*Beta,beta-dichlorovinyl diethyl phosphate*

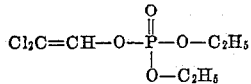

There were charged to a three-necked flask equipped with power-driven stirrer, water-cooled reflux condenser, and thermometer, 100 grams of triethyl phosphite. There were slowly run into the flask 89 grams of chloral (trichloroacetaldehyde). During the addition of the chloral the reaction mixture was vigorously stirred and the temperature was held to a maximum of 50° C. by cooling as required. Ethyl chloride which was formed by the reaction was taken overhead from the reflux condenser. After a total reaction time of 50 minutes the reaction mixture was rapidly distilled under 5–6 mm. mercury pressure to yield 135 grams of crude beta,beta-dichlorovinyl diethyl phosphate distilling at about 111° C. The crude beta,beta-dichlorovinyl diethyl phosphate was redistilled at 5 mm. mercury pressure with collection of the main fraction, amounting to 121 grams, at 112.7° C. to 113.5° C. The redistilled beta,beta-dichlorovinyl diethyl phosphate was analyzed for carbon, hydrogen, phosphorus and chlorine. Found: 29.1% C, 4.7% H, 12.5% P, 28.3% Cl. Calculated: 28.93% C, 4.45% H, 12.4% P, 28.5% Cl. The refractive index of the beta,beta-dichlorovinyl diethyl phosphate was found to be 1.4475 ($n$ 20/D). The structure of the beta,beta-dichlorovinyl diethyl phosphate was confirmed by the characteristics of its infrared absorption spectrum and by chlorination to produce alpha,beta,beta,beta-tetrachloroethyl diethyl phosphate. A 50-gram sample of the beta,beta-dichlorovinyl diethyl phosphate was chlorinated at about 30° C. until about 15 grams of chlorine had been taken up. The crude chlorination product was distilled in a falling-film molecular still at 110.8° C. under $1 \times 10^{-5}$ mm. mercury pressure. There were obtained 22 grams of alpha,beta,beta,beta-tetrachloroethyl diethyl phosphate having a refractive index of 1.4712 ($n$ 20/D). The alpha,beta,beta,beta-tetrachloroethyl diethyl phosphate was analyzed for carbon, hydrogen, phosphorus, and chlorine. Found: 21.5% C, 3.2% H, 44.2% Cl, 10.6% P. Calculated for $(C_2H_5O)_2PO(OCHClCCl_3)$: 22.52% C, 3.47% H, 44.32% Cl, 9.68% P.

EXAMPLE II

*Beta,beta-dichlorovinyl di-n-butyl phosphate*

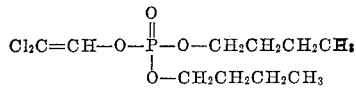

Chloral was added dropwise with stirring and cooling to an equimolar amount of tributyl phosphite. A reaction time of about 45 minutes was employed, and during the reaction the temperature of the reaction mixture was held at about 60° C. to 70° C. n-Butyl chloride was evolved during the reaction and allowed to escape through the reflux condenser as it formed. The reaction mixture then was rapidly distilled from a Claisen flask. After separation of a small amount of forerun containing unconsumed reactants crude beta,beta-dichlorovinyl di-n-butyl phosphate was collected as the fraction distilling at about 87° C. to 150° C. under 1 to 2 mm. mercury pressure. Five hundred seventy-five grams of the crude beta,beta-dichlorovinyl di-n-butyl phosphate were redistilled through a short packed column. There were collected 473 grams of beta,beta-dichlorovinyl di-n-butyl phosphate distilling between 132° C. under 2 mm. mercury pressure and 128° C. under 1 mm. mercury pressure.

EXAMPLE III

*Beta,beta-dichlorovinyl di-n-butyl phosphate*

A further sample of beta,beta-dichlorovinyl di-n-butyl phosphate was prepared in 83% yield by reaction between 50 grams of tributyl phosphite and 29.4 grams of chloral followed by fractional distillation of the reaction mixture to recover the product. The beta,beta-dichlorovinyl di-n-butyl phosphate was a water-white liquid having a boiling point of 128° C. to 129° C. under 1 mm. mercury pressure and a refractive index ($n$ 20/D) of 1.4439. The beta,beta-dichlorovinyl di-n-butyl phosphate was analyzed for phosphorus and its molecular weight was determined cryoscopically in benzene. Found: 10.7% P, molecular weight 302. Calculated: 10.15% P, molecular weight 305.

EXAMPLE IV

*Beta-chloro-beta-acetyl-alpha-methylvinyl diethyl phosphate*

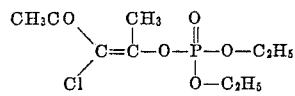

To 112 grams of 3,3-dichloro-2,4-pentanedione there were slowly added 50 grams of triethyl phosphite. The vigorous reaction was controlled by regulating the rate of addition of the triethyl phosphite and by cooling of the reaction vessel. After all of the triethyl phosphite was added the reaction mixture was fractionally distilled with collection of beta-chloro-beta-acetylvinyl diethyl phosphite as the fraction distilling between 118° C. and 123° C. under <1 mm. mercury pressure. Refractive index ($n$ 20/D), 1.4580 to 1.4613. The beta-chloro-beta-acetyl-alpha-methyl vinyl diethyl phosphate was analyzed for chlorine and phosphorus. Found: 12.6% and 12.6% Cl, 11.8% and 11.8% P. Calculated for $C_9H_{16}PO_5Cl$: 13.10% Cl, 11.45% P.

EXAMPLE V

*Beta,beta-dichlorovinyl dimethyl phosphate*

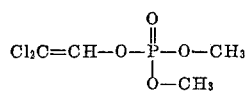

There were charged to a three-necked glass flask equipped with water-cooled reflux condenser, thermometer, and power-driven stirrer 65 grams of trimethyl phosphite. Over a period of 40 minutes there were added to the trimethyl phosphite 77 grams of chloral. During the addition of the chloral the reaction mixture was stirred and the temperature of the mixture was held at 48° C. to 55° C. by cooling as required. Methyl chloride which was formed in the reaction was permitted to escape from the reaction vessel through the reflux condenser as rapidly as formed. After standing overnight at room temperature the reaction mixture was rapidly distilled from a Claisen flask with collection of a 108-gram cut of crude beta,beta-dichlorovinyl dimethyl phosphate distilling at 83% C. under 2.3 mm. mercury pressure to 90° C. under 0.3 mm. mercury pressure. Conversion of the applied reactants to the crude product was 94% of theory. The crude beta,beta-dichlorovinyl dimethyl phosphate was redistilled through a short packed fractionating column with collection of an 87-gram fraction distilling between 81° C. and 82° C. under 1–2 mm. mercury pressure, refractive index ($n$ 20/D) 1.4510. A smaller fraction, amounting to 12 grams, was collected at 77° C. to 81° C. under 1–2 mm. mercury pressure and a bottoms fraction of 3 grams remained in the still kettle. The 6 grams unaccounted for represented handling losses and liquid hold-up in the column. The 87-gram fraction of beta,beta-dichlorovinyl dimethyl phosphate was analyzed for carbonyl groups, carbon hydrogen, chlorine, and phosphorus. Found: carbonyl less than 0.1 equivalent per 100 grams, 21.9% C, 3.3% H, 32.4% Cl, 14.2% P. Calculated: 0.0 equivalent of carbonyl per 100 grams, 21.74% C, 3.19% H, 32.09% Cl and 14.02% P. The characteristics of the infrared absorption spectrum of a sample of the beta-beta-dichlorovinyl dimethyl phosphate confirmed the structure thereof.

EXAMPLE VI

*Beta,beta-dichlorovinyl diisopropyl phosphate*

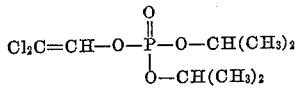

To a three-necked glass flask equipped with power-driven stirrer, water-cooled reflux condenser, and thermometer there were charged 95 grams of triisopropyl phosphite. Sixty-seven grams of chloral were added to the triisopropyl phosphite over a period of 55 minutes. During the addition of the chloral the temperature of the mixture was held at 67° C. to 75° C. by cooling as required and the reaction mixture was vigorously stirred. During the reaction the system was maintained under a slight vacuum to promote distillation of the evolved isopropyl chloride and the evolved isopropyl chloride was taken overhead through the reflux condenser as evolved. After completion of the reaction the reaction mixture was rapidly distilled from a Claisen flask. The crude distillate fraction, collected between 52° C. and 124° C. under about 1 mm. mercury pressure, was redistilled through a short packed fractionation column with separation of a 46-gram fraction of beta,beta-dichlorovinyl diisopropyl phosphate distilling at 81° C. under 0.35 mm. mercury pressure to 78° C. under 0.2 mm. mercury pressure and having a refractive index ($n$ 20/D) of 1.4422. The redistilled beta,beta-dichlorovinyl diisopropyl phosphate was analyzed for carbonyl, carbon, hydrogen, phosphorus and chlorine. Found: less than 0.03 equivalent of carbonyl per 100 grams, 34.7% C, 5.5% H, 25.9% Cl, 11.2% P. Calculated: 0.0 equivalent of carbonyl per 100 grams, 34.67% C, 5.46% H, 25.59% Cl, 11.44% P.

EXAMPLE VII

*Beta,beta-dichlorovinyl di-sec-butyl phosphate*

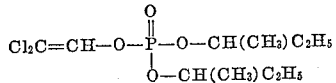

To a three-necked glass flask equipped with stirrer, thermometer, and reflux condenser there were charged 130 grams of tris(sec-butyl) phosphite. There then were added over a period of 50 minutes 77 grams of chloral. The temperature of the reaction mixture was maintained at about 70° C. to 85° C. by regulation of the rate of addition of the chloral. The reaction was carried out under an absolute pressure of about 180 mm. mercury to facilitate distillation of the by-product sec-butyl chloride from the reaction mixture as it formed therein. The reaction mixture then was rapidly fractionally distilled from a Claisen flask under <1 mm. mercury pressure. The distillate, boiling between 93° C. and 123° C. was redistilled through a short packed fractionation column. Redistilled beta,beta-dichlorovinyl di-sec-butyl phosphate was collected as the fraction distilling between 107 C. and 109.4 C. under 0.7 mm. mercury pressure. Refractive index ($n$ 20/D) 1.4465. The beta,-beta-dichlorovinyl di-sec-butyl phosphate was analyzed for carbon, hydrogen, chlorine, and phosphorous. Found: 39.9% C, 7.0% H, 22.1% Cl, 11.0% P. Calculated: 39.36% C, 6.28% H, 23.24% Cl, 10.15% P.

EXAMPLE VIII

*Beta,beta-dichlorovinyl ethyl benzenephosphonate*

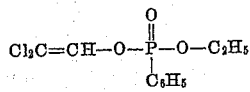

To a glass three-necked flask equipped with power-driven stirrer, reflux condenser, and thermometer there were charged 114 grams of diethyl benzenephosphonite, $C_6H_5—P(OC_2H_5)_2$. Over a period of 55 minutes there were added to the flask 85 grams of chloral, the rate of addition of the chloral being so regulated that the temperature of the reaction mixture was maintained between about 45° C. and 60° C. Ethyl chloride formed as a by-product of the reaction was allowed to escape as it formed through the reflux condenser. The resulting mixture then was distilled in a falling-film molecular still at 98° C. under $1 \times 10^{-5}$ mm. mercury pressure. There were obtained 143 grams of beta,beta-dichlorovinyl ethyl benzenephosphonate as a water-white liquid distillate, representing a conversion of applied reactants to product 95% of theory. The refractive index of the beta,beta-dichlorovinyl ethyl benzenephosphonate was found to be ($n$ 20/D) 1.5242. The beta,beta-dichlorovinyl ethyl benzenephosphonate was analyzed for carbon, hydrogen, chlorine, and phosphorus. Found: 43.3% C, 4.2% H, 24.4% Cl, 11.3% P. Calculated: 42.73% C, 3.95% H, 25.23% Cl, 11.02% P. The characteristics of its infrared absorption spectrum confirmed the structure of the product.

EXAMPLE IX

*Beta,beta-dibromovinyl diethyl phosphate*

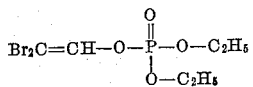

To the flask employed in preceding examples there were charged fifty-nine grams of triethyl phosphite. There were slowly added 100 grams of bromal (tribromoacetaldehyde) over a period of 55 minutes. During the first 50 minutes the heat liberated by the exothermic reaction warmed the mixture to 60° C. to 65° C. and the temperature was maintained in this range by regulating the rate of addition to the bromal. The temperature decreased during the last five minutes of addition of bromal. After all of the bromal was added the reaction mixture was warmed to 55° C. for five minutes. During the addition of the bromal the mixture was maintained under a moderate vacuum to facilitate the distillation of the by-product ethyl bromide. A 106 gram portion of the reaction mixture was distilled in a falling-film molecular still at 82° C. under $1.5 \times 10^{-3}$ mm. mercury pressure. There were obtained 96 grams of beta,beta-dibromovinyl diethyl phosphate as a pale yellow liquid having a refractive index ($n$ 20/D) of 1.4818. This was redistilled in the molecular still at 56° C. under $4 \times 10^{-5}$ mm. mercury pressure. There were collected 90 grams of purified beta,beta-dibromovinyl diethyl phosphate as a water-white liquid having a refractive index ($n$ 20/D) of 1.4810. The beta,beta-dibromovinyl diethyl phosphate was analyzed for carbon, hydrogen, phosphorus and bromine. Found: 21.9% C, 3.5% H, 47.0% Br, 9.6% P. Calculated: 21.32% C, 3.28% H, 9.17% P, 47.29% Br.

EXAMPLE X

Beta-chlorovinyl diethyl phosphate

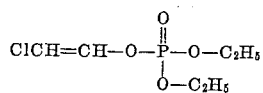

Employing the equipment described in the preceding examples, 120 grams of freshly distilled dichloroacetaldehyde were added to 176 grams of triethyl phosphite over a period of 45 minutes. During the addition of the dichloroacetaldehyde the temperature of the reaction mixture was held at about 45° C. to 60° C. by cooling as required. The mixture then was distilled through a short packed fractionation column, beta-chlorovinyl diethyl phosphate being collected as the fraction distilling at 116° C. to 118° C. under 10 mm. mercury pressure. Refractive index of the beta-chlorovinyl diethyl phosphate was ($n$ 20/D) 1.4352. A sample of the collected beta-chlorovinyl diethyl phosphate was analyzed for carbon, hydrogen, phosphorus, and chlorine. Found: 33.5% C, 5.7% H, 14.4% P, 17.3% Cl. Calculated: 33.58% C, 5.64% H, 14.44% P, 16.52% Cl.

EXAMPLE XI

Beta, beta-dichloro-alpha-phenylvinyl diethyl phosphate

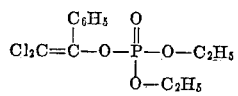

Employing the equipment described in preceding examples, 132 grams of trichloromethyl phenyl ketone were added to 100 grams of triethyl phosphite over a period of one-half hour. During the reaction the temperature was maintained at 20° C. to 40° C. by cooling as required. The reaction mixture then was stripped of unconsumed reactants by heating on the steam bath under about 1 to 5 mm. mercury pressure leaving 200 grams of a clear amber liquid. This liquid was molecularly distilled in a falling-film molecular still at 56° C. under $5 \times 10^{-5}$ mm. mercury pressure with removal of 23 grams of distillate. The remaining 164 grams of product then were molecularly distilled at 101° C. under $4 \times 10^{-5}$ mm. mercury pressure. There were obtained 148 grams of beta,beta-dichloro-alpha-phenylvinyl diethyl phosphate as a faintly yellow distillate having a refractive index ($n$ 20/D) of 1.5188 and containing (by analysis) 22.1% Cl, 43.6% C, 4.5% H, 9.5% P. Calculated: 21.8% Cl, 44.32% C, 4.65% H, 9.53% P.

EXAMPLE XII

Beta,beta-dichlorovinyl methyl benzenephosphonate

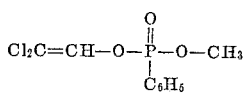

93 grams of chloral were added over a period of one-half hour to 107 grams of dimethyl benzenephosphonite. During the addition of the chloral the temperature of the mixture was held at 30° C. to 40° C. by cooling as required. Methyl chloride, formed as a by-product of the reaction, was distilled from the reaction mixture as rapidly as formed therein. Upon completion of the reaction the reaction mixture was stripped of low-boiling components by heating on the steam bath under 2 mm. mercury pressure leaving 168 grams of crude product. The crude product was molecularly distilled at 80° C. and $1 \times 10^{-4}$ mm. mercury pressure. Beta,beta-dichlorovinyl dimethyl phosphate was collected as a colorless distillate in the amount of 155 grams. Refractive index ($n$ 20/D) was found to be 1.5320. The beta,beta-dichlorovinyl methyl benzenephosphonate was analyzed for chlorine, carbon, and hydrogen. Found: 26.4% Cl, 39.4% C, 3.4% H. Calculated: 26.5% Cl, 40.47% C. and 3.39% H.

EXAMPLE XIII

Beta-chloro-alpha-phenylvinyl diethyl phosphate

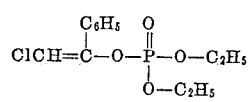

Employing the equipment described in preceding examples, 113 grams of dichloroacetophenone were added over a period of one-half hour to 100 grams of triethyl phosphite. During the addition of the dichloroacetophenone the temperature was maintained at 10° C. to 30° C. by cooling as required. The reaction mixture then was stripped by heating on the steam bath under about 2 mm. mercury pressure leaving a crude product consisting of 179 grams of a clear amber liquid. The liquid was molecularly distilled at 80° C. under about $6 \times 10^{-5}$ mm. mercury pressure. There were collected 163 grams of beta-chloro-alpha-phenylvinyl diethyl phosphate as a clear liquid having a refractive index ($n$20/D) of 1.5148. Analyses were as follows: Found: 12.9% Cl, 48.6% C, 5.5% H. Calculated: 12.2% Cl, 49.57% C, 5.54% H.

EXAMPLE XIV

Beta-chloro-beta-carbethoxy-alpha-methylvinyl diethyl phosphate

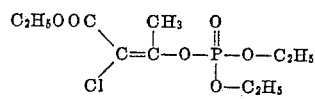

Employing the equipment described in preceding examples, 119 grams of ethyl dichloroacetoacetate were added to 99.5 grams of tirethyl phosphite over a period of 35 minutes. During the initial part of the reaction time the temperature increased slowly to 65° C. at which temperature a more vigorous exothermic reaction set in. Thereafter the temperature was allowed to increase to 85° C. to 90° C. and held at this level by regulation of the rate of addition of the ethyl dichloroacetoacetate. Ethyl chloride was evolved during the reaction and allowed to escape from the reaction mixture as formed. The resulting mixture was rapidly distilled from a Claisen flask with collection of a 166 gram fraction of crude beta-chloro-beta-carbethoxy-alpha-methylvinyl diethyl phosphate distilling at 130° C. to 137° C. under 0.5 to 1.5 mm. mercury pressure. The crude product was redistilled with collection of 111 grams of product distilling at 123° C. to 126° C. under 0.15 mm. mercury pressure. The redistilled beta-chloro-beta-carbethoxy-alpha-methylvinyl diethyl phosphate was analyzed for carbon, hydrogen, chlorine, and phosphorus. Found: 39.8% C, 10.4% P, 6.2% H, 11.9% Cl. Calculated: 10.30% P, 39.94% C, 6.03% H, 11.79% Cl. The infra-red absorption spectrum of the product contained absorption bands characteristic of the carbonyl group and of an ester linkage conjugate to a C=C linkage and the typical C=C absorption band was shifted from its normal position as would be expected from the presence of the chlorine substituent. The absorption spectrum showed bands characteristic of the P=O, P—O—C and C—O—C linkages.

EXAMPLE XV

Beta,beta-dichlorovinyl ethyl beta,gamma-dichloropropyl phosphate

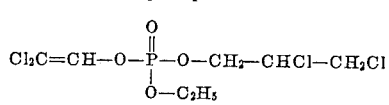

4-chloromethyl - 2 - chloro-1,3,2-dioxaphospholane (3-chloro-1,2-propylene chlorophosphite) was prepared by reaction of glycerol alpha-monochlorohydrin with phosphorus trichloride, and was reacted in turn with ethanol to produce 2-ethoxy-4-chloromethyl-1,3,2-dioxaphospholane. Employing the equipment described in preceding examples, 92.3 grams of 2-ethoxy-4-chloromethyl-1,3,2-dioxaphospholane were added over a period of 45 minutes to 73.7 grams of chloral. After the addition was completed the mixture was warmed to 180° C. to 190° C. under 200 mm. mercury pressure for 2 hours. Volatilized materials were collected in a cold trap suitably connected to the reaction vessel. There were collected 7.5 grams of ethyl chloride. The crude reaction mixture was fractionally distilled under 0.5 mm. mercury pressure with collection of 14 grams distillate (40° C. to 128° C.). The 128 grams of residue from the distillation were molecularly distilled at 132° C. under $1 \times 10^{-5}$ mm. mercury pressure. There were collected 96.5 grams of distilled beta,beta-dichlorovinyl ethyl beta,gamma-dichloropropyl phosphate. Found: 24.6% C, 3.4% H, 9.6% P, 42.3% Cl. Calculated: 25.3% C, 3.3% H, 9.3% P, 42.8% Cl. The reaction leading to the formation of this product may be written as in the following equation:

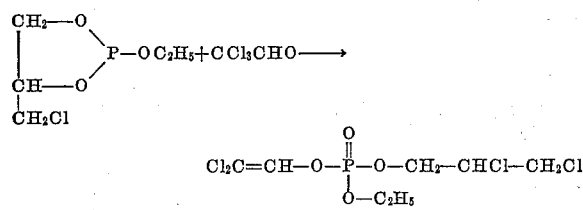

It will be noted that no ethyl chloride is formed in this reaction. The observed formation of a small amount of ethyl chloride can be accounted for by the occurrence to a minor extent of the following reaction:

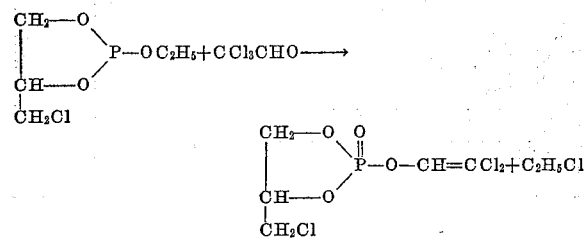

EXAMPLE XVI

*Beta,beta-dichlorovinyl ethyl gamma-phenoxy-beta-chloropropyl phosphate*

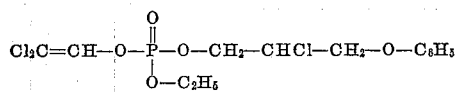

4 - phenoxymethyl-2-chloro - 1,3,2 - dioxaphospholane (phenyl glycerol alpha-monoether cyclo-chlorophosphite) was prepared by reaction of phenyl glycerol alpha-monoether with phosphorus trichloride, and was reacted in turn with ethanol to produce 2-ethoxy-4-phenoxymethyl-1,3,2-dioxaphospholane. Employing the equipment described in preceding examples, 100 grams of the 2-ethoxy-4-phenoxymethyl - 1,3,2 - dioxaphospholane were added over a period of 45 minutes to 60.9 grams of chloral. After the addition was completed the mixture was warmed to 190° C. for 1 hour, 6.5 grams of volatilized ethyl chloride being collected in a cold-trap suitably connected to the reaction vessel. The reaction mixture then was fractionally distilled with collection of 10 cc. of distillate between 91° C. and 182° C. under <0.5 mm. mercury. The residue from the distillation, amounting to 143 grams, was molecularly distilled with collection of 110 grams of distillate at 132° C. under $1 \times 10^{-5}$ mm. mercury pressure. The distillate was found by analyses to be beta, beta-dichlorovinyl ethyl gamma - phenoxy - beta-chloropropyl phosphate. Found: 39.6% C, 4.5% H, 8.1% P, 26.4% Cl. Calculated: 40.0% C, 4.1% H, 7.95% P, 27.3% Cl. The reaction leading to the formation of this product may be written as in the following equation:

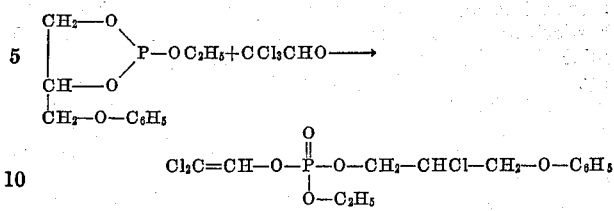

The formation of the observed small amount of ethyl chloride can be accounted for by the occurrence to a minor extent of the reaction described by the following equation:

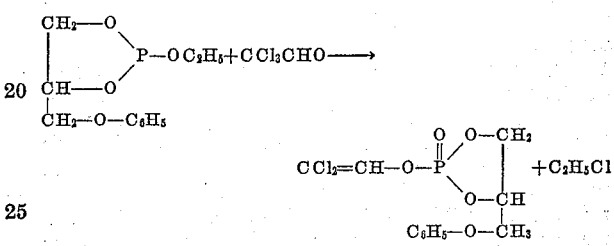

EXAMPLE XVII

*Beta,beta-dichlorovinyl ethyl phenyl phosphate*

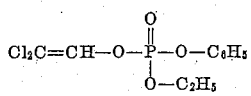

Employing the apparatus described in preceding examples, 14.7 grams of chloral were added to 21.5 grams of diethyl phenyl phosphite over a period of about 25 minutes. During the addition the temperature of the mixture was held at about 20° C. by cooling as required. The crude mixture was stripped by heating to 120° C. under 180 mm. mercury pressure and the non-volatilized portion (about 30 grams) was molecularly distilled at 110° C. under $5 \times 10^{-5}$ mm. mercury pressure. There were obtained 26.5 grams of beta-beta-dichlorovinyl ethyl phenyl phosphate as a colorless liquid having a refractive index (n 20/D) of 1.5024. The beta,beta-dichlorovinyl ethyl phenyl phosphate was analyzed. Found: 10.4% P, 23.2% Cl. Calculated: 10.4% P, 23.8% Cl.

Additional products that can be prepared by the method that is illustrated by the foregoing examples include: 2-chlorovinyl dimethyl phosphate; 2-chlorovinyl diisopropyl phosphate; 2,2-dichlorovinyl 3-chloropropyl ethyl phosphate; 2-chlorovinyl diphenethyl phosphate; 2-bromovinyl diethyl phosphate; O-(2-chlorovinyl) O,S-diethyl phosphorothioate; O-(2-chlorovinyl) S,S-diethyl phosphorodithioate; and 2-chloro-2-(methoxycarbonyl)-1-methylvinyl dimethyl phosphate.

The novel esters of beta-halogeno-vinyl alcohols with oxyacids of phosphorus acids provided by this invention have been found to be characterized by a high toxicity towards insects, such that the novel esters of the invention find extensive utility as insecticides. By the term insect we intend to include not only the members of the class Insecta but also related or similar non-vertebrate animal organisms belonging to allied classes of arthropods and including mites, ticks, spiders, wood lice, and the like. The novel esters of the invention can be used effectively for eradication of insects and similar pests and for protection against the ravages of insects and similar pests.

For employing the novel esters of the invention in combating insects and similar pests there can be employed the usual procedures familiar to those skilled in the art. For example, the agents may be sprayed or otherwise applied in the form of solutions or dispersions, or adsorbed on inert finely divided solids and applied as dusts. Solutions of the novel insecticides suitable for application by spraying, brushing, dipping, or the like, can be prepared using as the solvent any of the well-known horticultural carriers, such as kerosene, or similar light mineral oil distillates of intermediate viscosity and volatility. Adjuvants, such as spreading or wetting agents, may be included in the solutions, such as fatty acid soaps, rosin salts, saponins, gelation, casein, or other proteinaceous material, or synthetic wetting agents of the type of sulfates of long-chain fatty alcohols, alkyl aryl sulfonates, long-chain alkyl sulfonates, phenol-ethylene oxide condensates, $C_{12}$ to $C_{20}$ amines and ammonium salts, and the like. The solution may be dispersed or emulsified in water and the resulting dispersion or emulsion applied as the spray. Solid carrier materials which can be employed include talc, bentonite, lime, gypsum, pyrophyllite, and the like inert solid diluents. The novel esters also may be applied as aerosols, as by dispersing them into the air by means of a compressed gas. The more volatile of the novel esters may be employed as fumigants, although they have only a low volatility and hence are less effective when employed in this manner. The toxic agents of the invention can also be applied in agricultural uses as systemic poisons, i.e., as insecticides which are translocated within the living plant. When used in this manner the active agents are applied to the soil in the vicinity of the growing plant which it is desired to protect and are absorbed from the soil by the plant, or they are applied directly to the plant, wherein they are distributed throughout the tissues with the result that the plant as a whole acquires toxicity to insects which consume its edible portions.

The concentration of the active ingredient to be used with the above carriers will be dependent upon many factors, such as the particular beta-halovinyl phosphorus ester which is used, the carrier in or upon which it is incorporated, the method and conditions of application, the insect species to be controlled, etc., the proper consideration of these factors being within the skill of those versed in the art. In general, the toxic ingredients of this invention will be effective in concentrations from about 0.01% to about 0.5% by weight, based upon the total weight of the composition, although depending upon the circumstances as little as about 0.00001% or as much as 2% or even more of the active ingredient may be employed.

The toxic agents of this invention may be employed as the sole toxic ingredient of the insecticidal composition or they may be employed in conjunction with other insecticidally active materials. Such other insecticidally active materials include, without being limited to, the naturally-occurring insecticides, such as pyrethrum, rotenone, sabidilla, and the like, as well as synthetic materials such as compounds of arsenic, lead, and/or fluorine; DDT, benzene hexachloride, thiodiphenylamine, cyanides, tetraethyl pyrophosphate, O,O-diethyl-O-p-nitrophenyl thiophosphate, azobenzene, and the like.

The following examples illustrate the preparation and use of the new insecticidal compositions containing the toxic agents of this invention, and the results obtainable through their use.

EXAMPLE XVIII

Solutions of products prepared in examples described hereinbefore were made up employing a neutral petroleum distillate boiling within the kerosene range as the solvent. The solutions were tested for toxicity against the 2-spotted mite, *Tetranychus bimaculatus*, by spraying groups of plants infested with the insects under controlled conditions which varied from one test to the other only with respect to the identity of the toxic agent and its concentration. Thus, in each of the several tests the same total volume of spray was used. The following table shows the percentage of the insects in each group killed under the test conditions after having been sprayed with the specified concentrations of various beta-halovinyl phosphorus esters of this invention. The counts were made 24 hours after the application of the spray.

TABLE I

| Toxic Agent | Concentration, Percent w. | Percent Kill |
| --- | --- | --- |
| Beta,beta-dichlorovinyl diethyl phosphate | 0.1 | 87 |
| Beta,beta-dibromovinyl diethyl phosphate | 0.05 | 87 |
| Beta,beta-dichlorovinyl dimethyl phosphate | 0.2 | 85 |
| Beta-chloro-beta-acetoxy-alpha-methylvinyl diethyl phosphate | 1.0 | 98 |
| Beta,beta-dichlorovinyl ethyl 2,3-dichloropropyl phosphate | 0.2 | 90 |
| Beta,beta-dichlorovinyl methyl benzenephosphonate | 0.05 | 84 |
| Beta,beta-dichlorovinyl dibutyl phosphate | 1 | 80 |
| Beta,beta-dichlorovinyl ethyl benzenephosphonate | 0.2 | 79 |
| Beta-chloro-beta-carbethoxy-alpha methylvinyl diethyl phosphate | 0.2 | 73 |
| Beta,beta-dichlorovinyl ethyl 3-phenoxy-2-chloropropyl phosphate | 1 | 81 |

EXAMPLE XIX

Similar tests were carried out using the pea aphid, *Illinoia pisi*, as the test insect. The results shown in the following table were observed.

TABLE II

| Toxic Agent | Concentration, Percent w. | Percent Kill |
| --- | --- | --- |
| Beta-chlorovinyl diethyl phosphate | 0.2 | 98 |
| Beta,beta-dibromovinyl diethyl phosphate | 0.2 | 94 |
| Beta,beta-dichlorovinyl di-n-butyl phosphate | 0.1 | 49 |
| Beta-chloro-beta-carbethoxy-alpha methylvinyl diethyl phosphate | 0.05 | 95 |
| Beta,beta-dichlorovinyl diethyl phosphate | 1 | 90 |
| Beta,beta-dichlorovinyl dimethyl phosphate | 1 | 90 |
| Beta,beta-dichlorovinyl ethyl benzenephosphonate | 1 | 99 |
| Beta,beta-dichlorovinyl methyl benzenephosphonate | .05 | 69 |
| Beta-chloro-alpha-phenylvinyl diethyl phosphate | 1 | 70 |
| Beta,beta-dichlorovinyl ethyl phenyl phosphate | 1 | 93 |

EXAMPLE XX

Similar tests were carried out using the common housefly, *Musca domestica*, as the test insect. The results shown in the following table were observed.

TABLE III

| Toxic Agent | Concentration, Percent w. | Percent Kill |
| --- | --- | --- |
| Beta,beta-dibromovinyl diethyl phosphate | 0.01 | 93 |
| Beta,beta-dichlorovinyl dimethyl phosphate | 0.1 | 100 |
| Beta,beta-dichlorovinyl diisopropyl phosphate | 0.02 | 72 |
| Beta,beta-dichlorovinyl ethyl benzenephosphonate | .01 | 88 |
| Beta,beta-dichlorovinyl diethyl phosphate | 0.02 | 98 |
| Beta,beta-dichlorovinyl dibutyl phosphate | 1 | 100 |
| Beta,beta-dichlorovinyl di-s-butyl phosphate | 0.5 | 81 |
| Beta-chlorovinyl diethyl phosphate | .05 | 99 |
| Beta,beta-dichloro-alpha-phenylvinyl diethyl phosphate | 0.2 | 90 |
| Beta,beta-dichlorovinyl methyl benzenephosphonate | 0.1 | 93 |
| Beta-chloro-alpha-phenylvinyl diethyl phosphate | 1 | 90 |
| Beta-chloro-beta-carbethoxy-alpha-methylvinyl diethyl phosphate | 0.02 | 82 |
| Beta,beta-dichlorovinyl ethyl 2,3-dichloropropyl phosphate | 0.05 | 90 |
| Beta,beta-dichlorovinyl ethyl phenyl phosphate | 0.2 | 100 |

EXAMPLE XXI

The $LD_{50}$ for active agents of this invention was determined using the 2-spotted mite, the pea aphid, and the housefly as the test insects. The $LD_{50}$ is the concentration of the toxic agent in a solvent at which under standard test conditions a 50% mortality of the insects in each test is observed. The results shown in the following table were obtained.

TABLE IV

| Toxic Agent | LD₅₀ | | |
|---|---|---|---|
| | 2-spotted mite | pea aphid | housefly |
| Beta-chlorovinyl diethyl phosphate | 0.2 | 0.08 | 0.02 |
| Beta, beta-dibromovinyl diethyl phosphate | 0.03 | 0.08 | 0.005 |
| Beta-chloro-beta-acetyl-alpha-methylvinyl diethyl phosphate | 0.1 | | |
| Beta-chloro-beta-carbethoxy-alpha-methylvinyl diethyl phosphate | 0.11 | 0.02 | 0.012 |

EXAMPLE XXII

This example illustrates the systemic action of active agents of the invention. The tests were carried out by diluting 1% solutions of the active agents in acetone with water to yield the desired concentration. Young growing pinto bean plants infested with mites were carefully removed from the soil, the roots were washed with water, and the roots immersed in the test solution in a glass flask and the flask was stoppered with cotton around the stem of the plant. Mortality readings were taken after 48 hours. In the following table there are shown the concentration of the active agent in the test solution required to kill 50% of the insects on the infected plant upon 48 hours immersion of the roots in the solution.

TABLE V

| Active Agent | Concentration, p.p.m., for LD₅₀ |
|---|---|
| Beta,beta-dichlorovinyl diethyl phosphate | 3 |
| Beta,beta-dichlorovinyl dimethyl phosphate | 12 |
| Beta,beta-dibromovinyl diethyl phosphate | 1.5 |
| Beta-chlorovinyl diethyl phosphate | 0.75 |

EXAMPLE XXIII

Cotton plants infested with mites were treated by pouring an aqueous emulsion of beta-chlorovinyl diethyl phosphate on the soil over the root systems of the plants. The emulsion contained 0.01% by weight of beta-chlorovinyl diethyl phosphate. After 48 hours a mortality count was made. Mortality of the mites was found to be 100%. In another case growing uninfested cotton plants were treated similarly. Two weeks after the treatment the plants were deliberately infested with mites and a mortality count was made 48 hours after the infestation. A 98% mortality of the mites was observed. The mortality of mites on untreated control plants infested and observed at the time the above tests were made was less than 5%. Similar results were observed with broccoli and with calendula as the test plants.

The novel compounds of this invention are also useful in the formulation of wetting agents, plasticizers, pharmaceuticals and flame-proofing compositions. Additionally, they may be used as valuable chemical intermediates. For example, as a class they may be chlorinated to add chlorine to the unsaturation of the halogen-substituted vinylic group to yield valuable more highly chlorinated phosphate esters, such as alpha,beta,beta,beta-tetrachloroethyl diethyl phosphite formed by chlorination of beta,beta-dichlorovinyl diethyl phosphite and alpha,beta,beta,beta-tetrachloroethyl methyl benzenephosphonate formed by chlorination of beta-beta-dichlorovinyl methyl benzenephosphonate, that also are useful as insecticides.

We claim as our invention:

1. As a novel composition of matter, a compound of the structure

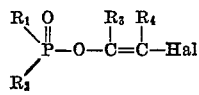

wherein $R_1$ and $R_2$ are independently selected from the group of organic radicals consisting of alkyl, alkoxy, chloroalkoxy, lower alkoxy "Cellosolve" ethers, phenoxychloroalkoxy, aryl, and aryloxy, each of the radicals represented by $R_1$ and $R_2$ containing not over 18 carbon atoms, Hal is an atom of halogen selected from the group consisting of chlorine and bromine, $R_3$ is a member of the group consisting of hydrogen, alkyl radicals, and aryl radicals, and $R_4$ is a member of the group consisting of hydrogen, halogen selected from the group consisting of chlorine and bromine, alkyl radicals, lower carboxy acyl radicals and carbalkoxy radicals, the group represented by

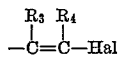

containing not over 18 carbon atoms.

2. Beta,beta-dichlorovinyl dialkyl phosphate, the alkyl groups thereof each containing from 1 to 10 carbon atoms.
3. Beta,beta-dichlorovinyl diethyl phosphate.
4. Beta,beta-dichlorovinyl dimethyl phosphate.
5. A beta-monochlorovinyl dialkyl phosphate wherein each of the alkyl groups contains from 1 to 18 carbon atoms and in which the chlorine atom substituted on the beta carbon atom of the vinyl group is the sole substituent on the said vinyl group.
6. Beta-chlorovinyl diethyl phosphate.
7. A beta,beta-dichlorovinyl alkyl benzenephosphonate in which the alkyl group contains from 1 to 18 carbon atoms and in which the chlorine atoms substituted on the beta carbon atom of the vinyl group are the only substituents on the said vinyl group.
8. Beta - chloro - beta - carbethoxy - alpha-methylvinyl diethyl phosphate.
9. A beta - chloro - alpha - arylvinyl dialkyl phosphate wherein the two said alkyl groups and the beta-chloro-alpha-arylvinyl group each contain no more than 18 carbon atoms.
10. The process which comprises commingling chloral and a trialkyl phosphite at a temperature of from 25° C. to 150° C., and thereby effecting reaction of said chloral with said trialkyl phosphite, and recovering the phosphorus-containing reaction product thereby formed from the resulting reaction mixture.
11. The process defined by claim 10 in which the trialkyl phosphite is trimethyl phosphite.
12. The process which comprises commingling to effect reaction between (a) a neutral ester of an acid of trivalent phosphorus, which ester has directly substituted on phosphorus through oxygen an alkyl group of from 1 to 6 carbon atoms and (b) a halogen-substituted carbonyl compound of the class consisting of halogen-substituted aldehydes and halogen-substituted ketones, having a total of from 1 to 2 aldehyde and ketone carbonyl groups and having directly bonded to the carbon atom of an aldehyde or ketone carbonyl group a saturated carbon atom on which there are directly substituted a plurality of atoms of halogen, whereby reaction is effected therebetween, said atoms of halogen being selected from the group consisting of chlorine and bromine and being the only reacting substituent on the molecule of the said halogen-substituted carbonyl compound, and said neutral ester being free of reacting substituents, and recovering the phosphorus-containing reaction product.
13. The process which comprises commingling a trialkyl phosphite and a halogen-substituted carbonyl compound of the class consisting of halogen-substituted aldehydes and halogen-substituted ketones, having a total of from 1 to 2 aldehyde and ketone carbonyl groups and having directly bonded to the carbon atom of an aldehyde or ketone carbonyl group a saturated carbon atom on which there are directly substituted a plurality of atoms of halogen, said atoms of halogen being selected from the group consisting of chlorine and bromine and being the only reacting substituents on the molecule of the said halogen-substituted carbonyl compound, and recovering the phosphorus-containing reaction product.

14. The process defined by claim 13 in which the halogen-substituted carbonyl compound is chloral.

15. The process defined by claim 13 in which the halogen-substituted carbonyl compound is dichloroacetaldehyde.

16. The process defined by claim 13 in which the halogen-substituted carbonyl compound is ethyl dichloroacetoacetate.

17. The process defined by claim 14 in which the trialkyl phosphite is trimethyl phosphite.

18. The process defined by claim 13 in which the halogen-substituted carbonyl compound is an alpha-polychloroalkyl aryl ketone.

No references cited.